(12) United States Patent
Kelly

(10) Patent No.: US 6,732,128 B2
(45) Date of Patent: May 4, 2004

(54) REDUCTION OF PERIODIC SIGNALS IN PSEUDO-RANDOM NOISE PRODUCED WITH DIRECT DIGITAL SYNTHESIS

(75) Inventor: Christopher P J Kelly, Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 483 days.

(21) Appl. No.: 09/772,805

(22) Filed: Jan. 30, 2001

(65) Prior Publication Data

US 2002/0103838 A1 Aug. 1, 2002

(51) Int. Cl.[7] .................................................. G06F 1/02
(52) U.S. Cl. ......................... 708/270; 708/271; 708/250
(58) Field of Search ................................. 708/250–256, 708/270–277

(56) References Cited

U.S. PATENT DOCUMENTS

| 4,125,898 | A | * | 11/1978 | DeHart et al. | ............... | 708/270 |
| 4,218,749 | A | * | 8/1980 | Babaud et al. | ............... | 708/253 |
| 6,173,003 | B1 | * | 1/2001 | Whikehart et al. | ......... | 708/250 |
| 6,263,017 | B1 | * | 7/2001 | Miller | ........................ | 375/222 |
| 6,532,256 | B2 | * | 3/2003 | Miller | ........................ | 375/222 |

OTHER PUBLICATIONS

McElroy et al., Pseudo–random noise generator, Mar. 11, 1981, UK Patent Application GB 2,056,136.*

* cited by examiner

Primary Examiner—Todd Ingberg
Assistant Examiner—Chat C Do
(74) Attorney, Agent, or Firm—Edward L. Miller

(57) ABSTRACT

A DDS (Direct Digital Synthesis) frequency synthesizer can be adapted to operate as a pseudo random noise generator by including a swept address ingredient that distributes (but does not eliminate) repetitive frequency components that would otherwise appear in the output of the basic DDS technique, (which fetches fixed but randomized values from a waveform memory). These residual distributed long period frequency components in the output of a swept DDS pseudo random noise generator are suppressed by making the sweep itself irregular. The noise generator includes an Address Increment Register (AIR) whose content: (1) alters the address used to fetch fixed randomized values from the waveform memory; and (2) is incremented to produce the swept address (different sequences of addresses). At some point the AIR value has been incremented as high as it will go (i.e., the end of the sweep has been reached), and the process must start over. Instead of reloading the AIR with same start value at the end of each sweep, some number of residual least significant bits are left as they were at the end of the sweep, while the remaining upper bits are indeed reloaded to the previously used start value. At the end of each next sweep the residual AIR bits are different from what they were at the end of the previous sweep, ensuring that addresses sequences in the waveform memory are less periodically revisited. These residual bits will eventually repeat, but their cycle length significantly interferes with periodic signals in the noise output having periods less than the product of the period of the sweep with the period of the recycling for the residual least significant AIR bits.

4 Claims, 2 Drawing Sheets

REDUCTION OF PERIODIC SIGNALS IN PSEUDO-RANDOM NOISE PRODUCED WITH DIRECT DIGITAL SYNTHESIS

BACKGROUND OF THE INVENTION

A number of scientific and engineering disciplines employ random noise as component part within certain of the techniques practiced by the discipline. This is well known, as indicated by the length of time that various kinds of noise generators have been on the market (at least fifty years). And while noise in an electronic (or other) system often occurs as an unwanted component, true random noise obeying desirable rules of spectral content over a selected bandwidth is often a difficult or expensive thing to obtain, and a variety of ways have been used to produce it. Inherently analog methods of noise generation include the use of thermionic devices, semiconductor junctions, and thermal noise within resistors. These analog methods each have their advantages and disadvantages. Disadvantages are that they share are issues of cost and alteration or deterioration over time. The advent of digital technology has led to the development of various inherently digital techniques that are not inherently analog, and that rely on DAC's (Digital to Analog Converter's) to change a suitable stream of pseudo random digital values into the corresponding analog waveform. These inherently digital techniques have much to recommend them for general purpose low cost use, including easy control of bandwidth and distribution statistics. These methods include the direct computation (in real time!) of random numbers from suitable functions, PRBS (Pseudo Random Binary Sequence) generators, and also an adaptation of a frequency agile synthesis technique called DDS (Direct Digital Synthesis). While conceptually elegant, direct computation for high bandwidth signals (especially Gaussian ones) requires expensive computational horsepower that may be out of proportion to the costs within the rest of the instrument (which is, say, a modestly priced function generator of the bench top test equipment variety). PRBS generators uses tapped linear feedback shift registers, and as such, consume dedicated hardware not useable for anything else, and whose feedback taps are often difficult to modify in order to bring the output into compliance with desired statistical properties. In many environments DDS is often the preferred choice for generation of pseudo random noise.

DDS is believed to have originally been developed for agile synthesis of sine waveforms, such as would be used in spread spectrum transceivers. Its adaptation to become a random noise generator is relatively simple to implement. In basic DDS, a fixed, but fairly long, sequence of digital values representing a periodic signal is stored in a waveform memory. Values are read from the waveform memory at a fixed rate, but from addresses produced in accordance with the desired output frequency. The values read are applied to a DAC whose output is then filtered by a suitable analog filter. The first step in making DDS operate as a random noise generator is to load the waveform memory with a long sequence of random digital values. To obtain different statistical distributions correspondingly different sequences of values are placed into the waveform memory. This simple adaptation of the basic DDS technique is flexible, low in cost and capable of high bandwidths, but suffers from relatively poor randomness, owing to the regularity with which the same particular random numbers that are stored in the waveform memory are played back. To fix that, basic DDS has in the past been augmented with a swept address ingredient that distributes, over a series of waveform memory playback cycles, the periodic components produced by the basic technique. The result is much improved, but alas, some users report that upon concerted effort they have detected residual long period periodic signals that are in the range of 80 dB to 100 dB below the RMS value of the overall noise signal. It would be desirable if these artifacts could be inexpensively further suppressed, and the honor and reputation of advanced DDS as a pseudo random noise generator restored. What to do?

SUMMARY OF THE INVENTION

Residual distributed long period frequency components in the output of a swept DDS pseudo random noise generator are essentially suppressed beneath measurability (say, by more 100 dB below the RMS value of the overall signal) by making the swept address itself irregular. In a preferred embodiment there is a Address Increment Register (AIR) whose content: (1) alters the address used to fetch values from the waveform memory; and (2) is incremented to produce the sweep. At some point the AIR value has been incremented as high as it will go (i.e., the end of the sweep has been reached), and the process must start over. Instead of reloading the AIR with same start value at the end of each sweep, some number of residual least significant bits are left as they were at the end of the sweep, while the remaining upper bits are indeed reloaded to the previously used start value. At the end of each next sweep the residual AIR bits are different from what they were at the end of the previous sweep. This prevents consecutive sweeps from exhibiting patterns in the addresses visited in the Waveform Memory. After the fashion of repeating digits in a rational fraction, these residual bits will eventually repeat, but their cycle length significantly interferes with periodic signals in the noise output having periods less than the product of the period of the sweep with the period of the recycling for the residual least significant AIR bits.

DESCRIPTION OF A PREFERRED EMBODIMENT

Figure 1:
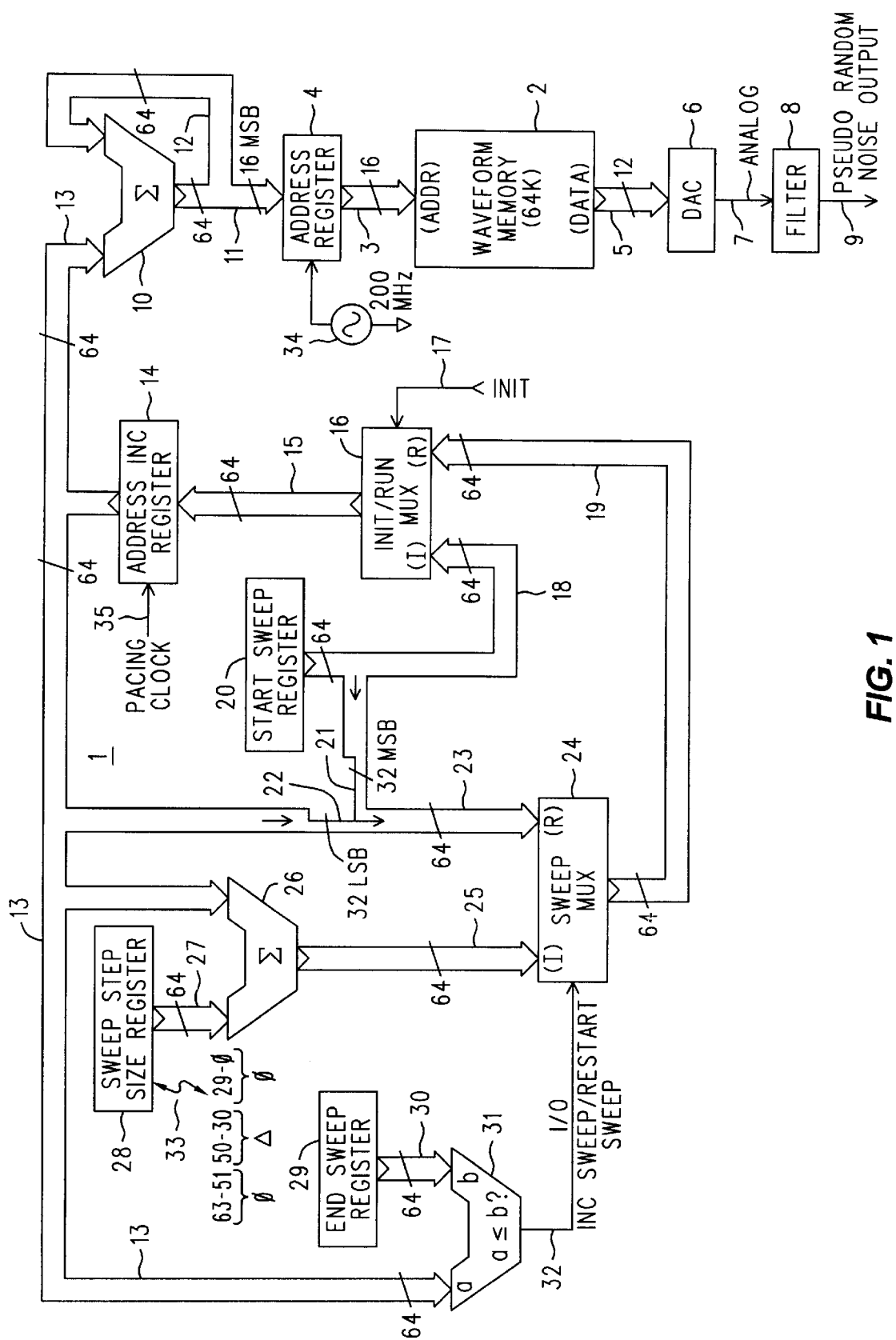
FIG. 1 is a simplified block diagram of a DDS circuit that has been adapted to generate pseudo random noise, and then improved to suppress spurious long period components in the output.

Refer now to FIG. 1, wherein is shown a simplified block diagram 1 of a DDS circuit that is an improved adaptation for the generation of pseudo random noise. The improved circuit may be used by a function generator in a dual fashion where the DDS technique does both synthesis of periodic waveforms (regular sine, sawtooth, triangle, etc. or, arbitrary user defined) and the generation of pseudo random noise. For example, the circuit 1 is used in the Agilent 33250A 80 MHz Function Generator/Arbitrary Waveform Generator. A similar, but unimproved, circuit was used in the Hewlett-Packard 33120A Function Generator, and it has a small but detectable amount of periodic content in its generated pseudo random noise. At present, it appears that any amount of periodic content in the pseudo random noise produced by the Agilent 33250A is below detectable levels, even when lengthy and sophisticated eight digit sampling techniques are employed with determination in a laboratory setting.

As a point of departure, we assume that the reader is familiar with DDS. Brief descriptions of DDS may be bound in the User's Guides for the aforementioned function generators. If one were to peruse those descriptions, one would find that those Guides include some mention of pseudo random number capability and deal with what is essentially the left and right thirds of FIG. 1. As for the right third of FIG. 1, note that there is a fair-sized (64K address/12 data bits per address) Waveform Memory 2 that is addressed by the sixteen bit output 3 of an Address Register 4. As locations in the Waveform Memory 2 are addressed (which occurs at a fixed 200 MHz rate, owing to clock 34) the twelve bit data output 5 is applied to a DAC 6 whose analog output is in turn filtered by a suitable Filter 8. (A ninth order elliptical filter is used when generating continuous sine waves, because of its nearly flat passband and sharp cutoff. However, since elliptical filters exhibit severe ringing for non-sinusoidal waveforms, a seventh order linear phase filter is used when an arbitrary waveform or random noise is being generated.) The output 9 of the Filter 8 will become, after suitable signal conditioning (impedance conversion, attenuation, DC offset, etc.) the desired synthesized signal.

In standard DDS the synthesized signal is periodic; assume for the sake of simplicity that one whole cycle of the waveform to be synthesized has been expressed as a sequence of consecutive and regularly spaced twelve bit values, 64K in number, and that these are what is stored in the Waveform Memory 2. Under these circumstances, we would say that the waveform has a length of 360°, that an address of zero for the Waveform Memory would fetch the value of the waveform at 0°, and that the largest address would fetch the waveform value for 359.999°. We would note that rate at which the addresses applied to the Waveform Memory traverses the stored waveform determines the output frequency. That is, the rate of fetched values can remain fixed at 200 MHz, while it is the rate of address change (its progression through the address space) that determines the output frequency. What is in the Waveform Memory only determines the shape of the output, and is a "template", so to speak. It would be appropriate for us to associate the notion of phase with this process, and indeed, those already familiar with DDS will recognize Address Register 4 as the "Phase Register" in a conventional DDS circuit. We further note that, owing to the restorative properties of the Filter 8, it is not necessary to step through the addresses of the Waveform Memory 2 in consecutive order. Instead, we "sample" at a constant 200 MHz rate the "waveform template" to be synthesized, while adjusting the distance apart (in addresses) of the locations sampled so that the reconstruction by the Filter 8 is at the desired frequency. Indeed, the usual case is for consecutive waveform records (sample passes through the Waveform Memory that correspond to a cycle of the waveform of interest) to be taken from different totally disjoint collections of addressed values in the Waveform Memory 2.

In order to traverse the address space of the Waveform Memory 2, an Adder 10 combines by modulo addition an Address Increment 13 (called a Phase Increment in standard DDS) with the previous address 12. To satisfy the needs of the technique, this addition is performed with sixty-four bit numbers. The Address Increment 13 is never so large that it needs that many bits; it is more that it might be much smaller than the phase resolution of the stored waveform in the Waveform Memory 2 (sixteen bits). Thus, it is seen from the figure that only the sixteen MSB's (Most Significant Bits) 11 of modulo addition result 12 are stored in the Address Register 4. The arrangement shown allows a small value in a few LSB's (Least Significant Bits) of the Address Increment 13 to be the other addend applied to Adder 10. It is in this way that DDS can precisely produce a very large number of closely spaced frequencies. The Address Increment is kept in an Address Increment Register (AIR) 14, which DDS folks will recognize as a Phase Increment Register (PIR). It is this Address (Phase) Increment Register 14 that is swept (in addition to its normal incrementing) to adapt DDS to the pseudo random generation of noise. Naturally, when the pseudo random noise generation mode is in effect the contents of the Waveform Memory are also changed to contain a collection of random numbers having selected statistical properties (a thing well understood in itself, and which we need not delve into). At this point it will be appreciated that the notion of phase loses its usefulness when pseudo random noise is being generated. Our interest is when the DDS technique is configured to generate noise; accordingly, we show an Address Register 4 and an Address Increment Register 14, and dispense with the notion of phase so familiar to DDS users.

So, what we have described so far is a modified DDS structure that contains selected random numbers in the Waveform Memory 2, an addressing mechanism that, starting with an AIR 14 steps through the address of the Waveform Memory 2 (as it would for all DDS), and which is said to exhibit sweep. By sweep we mean that the Address Increment 13 does not stay fixed, as it would for standard DDS. Instead, it "wobbles" about some otherwise normal fixed value. That is, there is a step size, expressed as a value 27 stored in a Sweep Step Size Register 28 that causes the content of the Address Increment Register 14 to contain sequences of consecutive values that are each different from their neighbor by the amount Sweep Step Size 27. This is accomplished by Adder 26, which receives as inputs the old value of Address Increment 13 as well as the value Sweep Step Size 27. Its combined sum is adder output 25, which in due course will be loaded into the Address Increment Register 14, allowing the process of sweeping to continue. The sweep is a sequence of relatively small steps. The rate at which the sweep proceeds according to these steps is governed by the update rate for new values in the Address Increment Register 14 itself. That rate is supplied by a signal called Pacing Clock, and in the Agilent 33250A is around 468 KHz. The exact rate is not particularly critical, and that one was simply an easy appropriate rate to get, given the rest of the 33250's internal architecture. Pacing Clock 35, the upper and lower sweep limits, and the magnitude of Sweep Step Size 27 combine to produce an outcome related to the rate of change in the address applied to the Waveform Memory and the number of sweeps per second. In the case of the Agilent 33250A sweep repetition rate was chosen to be in the neighborhood of about thirty sweeps per second. This rate of sweep repetition is one of many that are practical and useful; we just happened to choose thirty.

Some care should be exercised when selecting a value for Step Size 27. Note the partition of bits shown by arrow 33. It shows that the active portion of Step Size 27 is preferably confined to about bits thirty to fifty. Recall that a waveform record is the contents of sampled addresses in a pass through the Waveform Memory that correspond to a cycle of the waveform to be output. A constraint on Address Increment 13 is that there be at least two hundred such addresses in a waveform record. Even though this is easier to appreciate in the periodic waveform case, the notion still applies in the pseudo random noise case. So, if Step Size is too big it can make Address Increment too big, also. Furthermore, it is desirable for there to be two increments by Adder 10 to addresses a different location in Waveform Memory 2. This is desirable to prevent playing back the contents of the Waveform Memory in strict sequential order, which increases the likelihood of producing unwanted long period signals in the output.

To continue, it will be noted that the arrangement described so far will produce a steady increase in the value of Address Increment 13. This, of course, is the essence of the sweep, but it cannot be expected to behave this way indefinitely. The sweep is to have an upper limit, which, after reaching, the sweep continues up from an abruptly lower value. (We are describing, of course, a saw tooth type sweep. One could also perform a triangle wave type sweep that ramps down after ramping up. It would seem to be a matter of choice, especially if implemented in the software of a controller.) To this end (and assuming a purely hardware implementation), an End Sweep Register 29 contains an End of Sweep Value 30 which is compared by a Comparator 31 against the current value of Address Increment 13. When the comparison indicates that the end of the sweep has been reached (a≧b in terms of the legends in the figure), then a signal from the Comparator 31 called Inc Sweep/Restart Sweep 32 goes false indicating that a>b (Address Increment exceeds the End of Sweep Value) and causing a Sweep MUX 24 to select its (R) input rather than its (I) input, which input value 23 is the thirty-two LSB's 22 of the current Address Increment value and the thirty-two MSB's 21 from a Start Sweep Register 20. This particular division of MSB's and LSB's to create input 23 is preferred, but is nevertheless merely illustrative.

The Start Sweep Register 20 contains a lower value than does the End Sweep Register 29, so after one further cycle of addition in Adder 26 the value in the Address Increment Register will again fall below the value in the End Sweep Register 29. Then the comparison produced by Comparator 31 will again cause Sweep MUX 24 to select its (I) input 25 (the Address Increment as incremented by Sweep Step Size 27), and the next instance of sweep is under way. The next sweep will not be an exact repetition of its predecessor, however, since the lower LSB's were not reset, but left as they were. By resetting the MSB's we ensure that the next sweep occurs in the right general area, but by preventing consecutive sweeps from being the same we avoid revisiting the same addresses in the Waveform Memory. That is what suppresses the periodic components detectable in the output of the pseudo random noise technique using DDS with straight sweep.

At turn-on a signal Init 17 is briefly present to load AIR 14 via an Init/Run MUX 16 with the full sixty-four bit value of the Start Sweep Register 20. This gets the sweep started for the first time. After that Init 17 goes false and the Init/Run MUX 16 selects its (R) input as its normal input for the duration of operation as described in the preceding few paragraphs.

Figure 2:
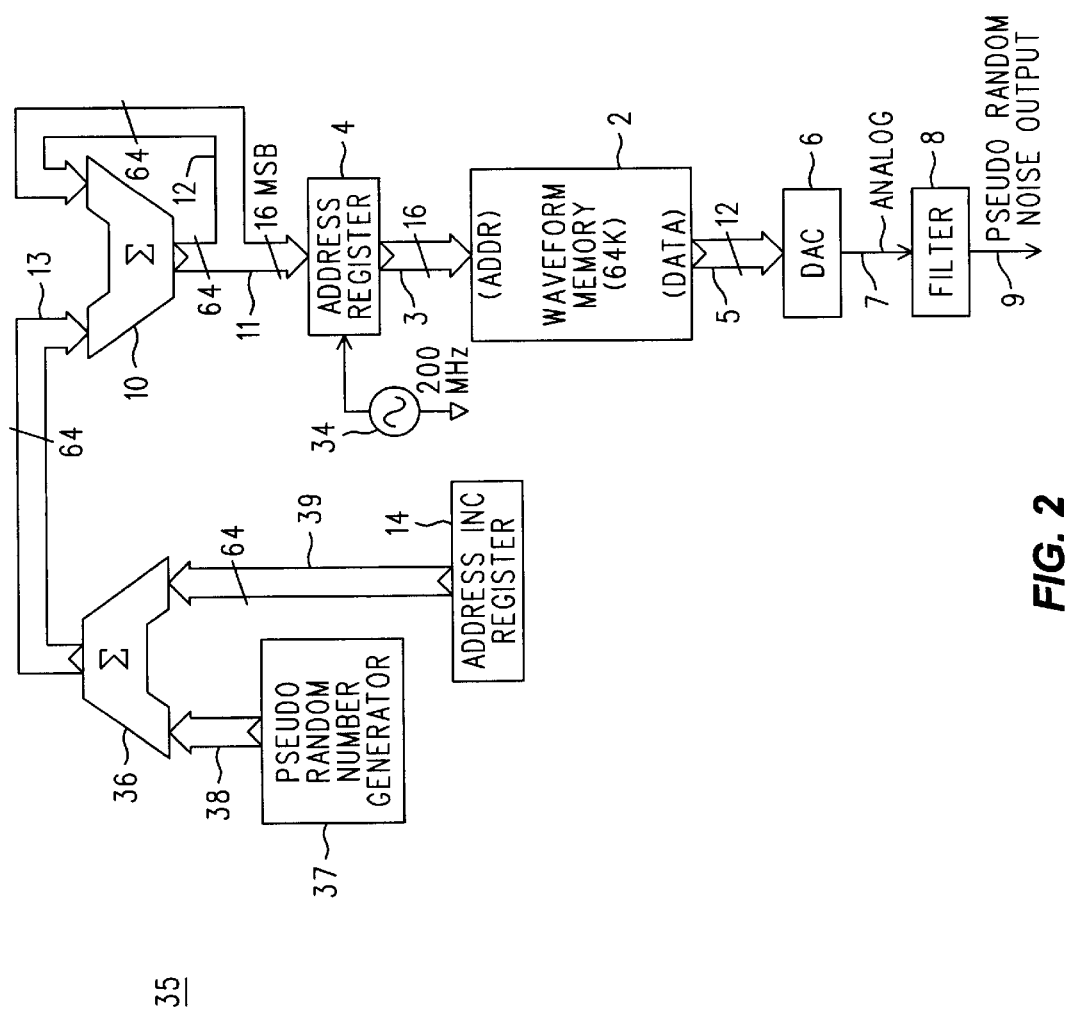
FIG. 2 is a simplified block diagram of an alternate embodiment using an auxiliary pseudo random number generator in place of a sweep mechanism to produce addresses to a Waveform Memory.

What we have shown as a preferred embodiment is an irregular sweep. An alternate embodiment 35 is shown in FIG. 2. The sweep mechanism has been replaced with an auxiliary pseudo random number generator 37 whose output 38 is constrained within a desired range (as for Step Size 27 in FIG. 1) and that is added by an Adder 36 to the content 39 of the AIR 14. The resulting sum is then applied as input 13 to Adder 10. Such an auxiliary pseudo random number generator 37 would not have to have outstanding randomness, and could be fairly simple, say, a tapped liner feedback shift register in a hardware embodiment, or one of the easy to implement PNR (Pseudo Random Number) routines in a software implementation.

It will be appreciated by those skilled in the art that the hardware embodiments shown can be implemented in a number of ways, such as with discrete merchant integrated circuits, or, by programming FPGA's (Field Programmable Gate Arrays) or even by genuine direct implementation with a custom LSI (Large Scale Integration) part. Software implementations range from programming standard embedded systems of microprocessor and memory with suitable algorithms that emulate the hardware operation shown, to state machine and special purpose DSP (Digital Signal Processing) circuits that are either programmed FPGA's or dedicated LSI.

I claim:

1. A method of generating pseudo random noise with Direct Digital Synthesis, the method comprising the steps of:

(a) storing in a memory addressable by an n-bit address a collection of pseudo random digital values that exhibits a selected statistical property, there being one digital value stored in each addressable location of the memory;

(b) incrementing with modulo arithmetic of modulus $2^m$, at regular intervals and by an address increment value, an in-bit number, m>n, (c) varying the address increment value between selected limits;

(d) addressing the memory with the n-many most significant bits of the m-bit number;

(e) reading from the memory the digital value at the address of step (d);

(f) applying the digital value read in step (e) to a DAC to produce an analog value; and (g) filtering the analog value.

2. A method as in claim 1 wherein the step (c) of varying the address increment value comprises the steps of:

(c1) incrementing the address increment value by a step size;

(c2) subsequent to step (c1), comparing the incremented address increment value of step (c1) to an upper limit:

(c3) if the comparison of step (c2) determines that the upper limit has been exceeded, then resetting a most significant portion the incremented address increment value to a start value while leaving the remaining least significant bits as they were at the conclusion of step (c1); and (c4) if the comparison of step (c2) determines that the upper limit has not been exceeded, then leaving the entire incremented address increment value as it was at the conclusion of step (c1).

3. A method as in claim 1 wherein the step (c) of varying the address increment value comprises the step of changing the address increment value by a pseudo random value whose magnitude is within a selected range.

4. A method as in claim 1 wherein m is sixty-four and the address increment value is a binary integer of at least about fifty bits, and further wherein the selected limits of step (c) are the range of from about bit thirty to about bit fifty.

* * * * *